United States Patent [19]

Miyoshi

[11] 4,359,293

[45] Nov. 16, 1982

[54] CONNECTOR

[75] Inventor: Ichiro Miyoshi, Kobe, Japan

[73] Assignee: Duskin Franchise Co., Ltd., Osaka, Japan

[21] Appl. No.: 233,453

[22] Filed: Feb. 11, 1981

[51] Int. Cl.[3] .............................................. F16D 3/00

[52] U.S. Cl. .................................... 403/58; 403/122; 403/291; 403/165; 403/142

[58] Field of Search ..................... 403/17, 33, 58, 165, 403/291, 142, 122

[56] References Cited

U.S. PATENT DOCUMENTS

| | | | |
|---|---|---|---|
| 2,561,969 | 7/1951 | Bowditch | 403/142 |
| 2,940,800 | 6/1960 | Knapp | 403/58 |
| 3,191,977 | 6/1965 | Sarafinas | 403/142 |
| 3,236,546 | 2/1966 | Cranskens | 403/291 X |

*Primary Examiner*—Wayne L. Shedd
*Attorney, Agent, or Firm*—Sherman & Shalloway

[57] ABSTRACT

Disclosed is a connector for detachably and rotatably connecting one article to another article, which comprises an insert member to be attached to said one article and a receiving member having a space for insertion of said insert member, which is to be attached to said another member, wherein said insert member has an engaging annular peripheral portion having a void or hollow at the center thereof, a pair of spherical projections capable of elastic and reversional deformation are arranged in the insertion space of the receiving member to confront each other, and such a dimensional relation is established between the engaging annular peripheral portion and the spherical projections that the distance between apexes of the spherical projections is smaller than the thickness of the engaging annular peripheral portion and when said insert member is inserted into the receiving member, the engaging annular peripheral portion is rotatably gripped and supported by the peripheral parts of the paired spherical projections. This connector has a simple structure and is excellent in the stoutness and the adaptability to the operations of attaching two articles to each other and detaching them from each other. This connector is used especially suitably for detachably and rotatably connecting a mop handle and a mop supporting frame in a large-size floor cleaner.

5 Claims, 3 Drawing Figures

CONNECTOR

BACKGROUND OF THE INVENTION (1) Field of the Invention:

The present invention relates to a connector for connecting detachably and rotatably a plurality of articles, especially a mop handle and a mop supporting frame. More particularly, the present invention relates to a connector in which the structural elements are very simple and the entire structure is much simplified and which is excellent in the stoutness and the adaptability to the attaching an detaching operations.

(2) Description of the Prior Art:

In a large cleaning mop for business purpose, which is used for cleaning a broad floor surface, the size of a supporting frame for supporting a mop is increased, and accordingly, in order to facilitate keeping and transfer of the cleaning mop, it is required that the mop supporting frame should detachably be connected to a handle and in order to facilitate the cleaning operation, it is required that the handle should be rotated in an optional direction with respect to the mop supporting frame.

However, if it is intended to construct a connector having functions capable of satisfying these requirements, the structure of the connector inevitably becomes complicates and it is often difficult to impart to the connector a stoutness capable of resisting a rough handling. For example, in case of a connector excellent in the adaptability to the attaching and detaching operations, accidental detachment of a mop supporting frame from a handle is often caused during the cleaning operation. Furthermore, even in case of a connector in which the frequency of occurrence of this undesirable phenomenon is relatively reduced, while the rotating and detaching-attaching operations are repeated for a long period of time, detachment is liable to occur accidentally during the cleaning operation under application of a relatively small force.

SUMMARY OF THE INVENTION

It is therefore a primary object of the present invention to provide a connector for detachably and rotatably connecting two articles, which has simple structure constructed by a small number of elements and which is excellent in the stoutness and the adaptability to the attaching-detaching operation.

Another object of the present invention is to provide a connector for a mop cleaner, in which accidental detachment of a mop supporting frame from a mop handle is prevented during the ordinary cleaning operation and the operation of detaching the mop supporting frame from the mop handle can be accomplished very easily.

In accordance with the fundamental aspect of the present invention, there is provided a connector for detachably and rotatably connecting one article to another article, which comprises an insert member to be attached to said one article and a receiving member having a space for insertion of said insert member, which is to be attached to said another member, wherein said insert member has an engaging annular peripheral portion having a void or hollow at the center thereof, a pair of spherical projections capable of elastic and reversional deformation are arranged in the insertion space of the receiving member to confront each other, and such a dimensional relation is established between the engaging annular peripheral portion and the spherical projections that the distance between apexes of the spherical projections is smaller than the thickness of the engaging annular peripheral portion and when said insert member is inserted into the receiving member, the engaging annular peripheral portion is rotatably gripped and supported by the peripheral parts of the paired spherical projections.

DETAILED DESCRIPTION OF THE PREFERRED EMBODIMENTS

The connector of the present invention can be used for openably and detachably connecting two optional articles, such as a wall member and a door, to each other. However, the connector of the present invention is especially suitable for connecting a mop supporting frame and a mop handle detachably and rotatably to each other in a mop cleaner. Accordingly, the present invention will now be described in detail mainly with reference to this embodiment.

Figure 1:
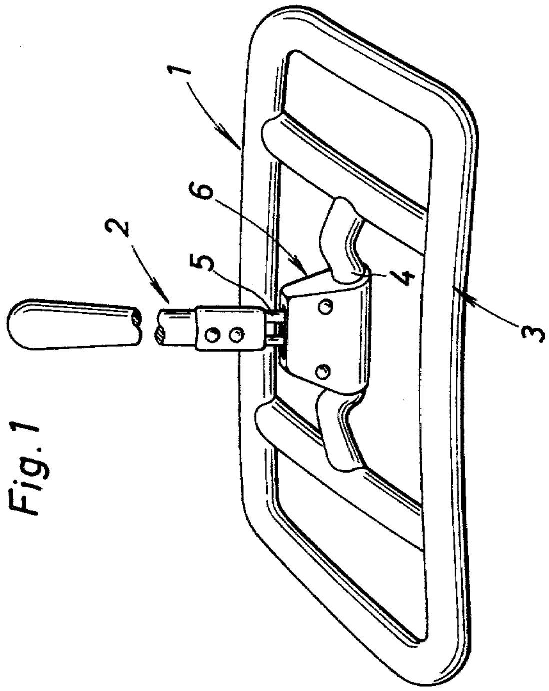
FIG. 1 is a perspective view showing an assembly of a mop supporting frame and a mop handle in which the connector of the present invention is used.

The structure of a mop holding member is schematically illustrated in FIG. 1. Referring to FIG. 1, this mop holding member comprises a mop supporting frame generally represented by reference numeral 1, a mop handle generally represented by reference numeral 2 and a connector described hereinafter. The mop supporting frame 1 comprises a frame 3 for supporting a mop and a horizontal shaft 4 attached thereto.

Figure 3:
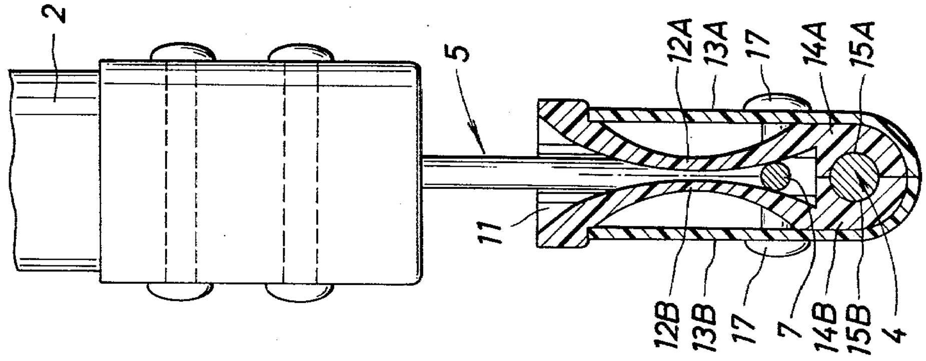
FIG. 3 is a view showing the section taken along the line III—III in FIG. 2.
Figure 2:
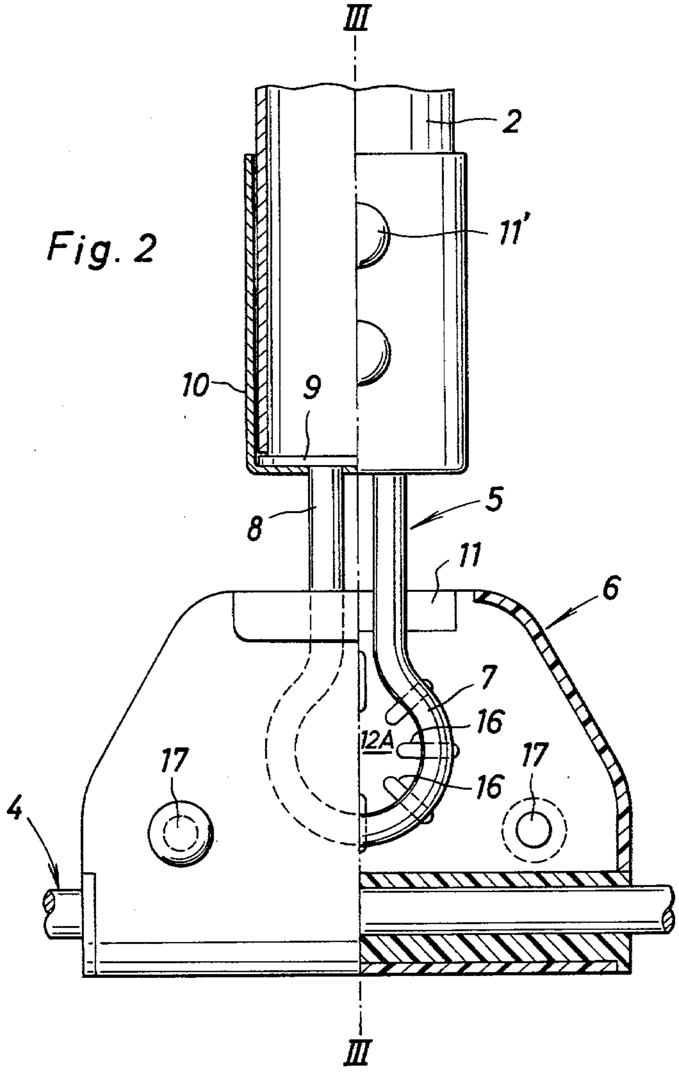
FIG. 2 is a sectional partial side view of the connector of the present invention.

Referring to FIGS. 2 and 3 illustrating the structure of the connector according to the present invention in detail, the connector comprises an insert member 5 attached to one end of the mop handle 2 and a receiving member 6 rotatably attached to the horizontal shaft 4 of the mop supporting frame 1. The insert member 5 has an engaging annular peripheral portion 7 having a void or hollow at the center thereof. In the embodiment specifically illustrated in the accompanying drawings, the insert member 5 is formed of a rigid round metal rod or pipe and it includes two legs 8 extending straight from the handle 2 and the annular portion 7 connected to the legs 8. The ends of the two legs 8 are welded to a disc 9 having the same size as that of the section of the handle 2, and this disc 9 is secured to one end portion of the handle 2 through a cover 10 formed of a bottomed cylinder and a rivet 11'.

The receiving member 6 is rotatably attached around the horizontal shaft 4 of the mop supporting frame 1, and a space 11 for insertion of the insert member 5 is formed in the interior of the receiving member 6. A pair of spherical projections 12A and 12B capable of elastic end reversional deformation are arranged in this space 11 to confront each other. In the embodiment specifically disclosed in the accompanying drawings, the receiving member 6 is comprised of outer metallic covers 13A and 13B and inner synthetic resin members 14A and 14B, and these members are arranged so that they can be split from one another along the vertical section. The inner members 14A and 14B are formed integrally with the spherical projections 12A and 12B, respectively, and semi-circular grooves 15A and 15B for receiving the horizontal shaft 4 are formed in the lower portions of the inner members 14A and 14B, respectively. In order to keep the spherical injections 12A and 12B to be capable of elastic and reversional deformation, the injections 12A and 12B are formed so that in each projection, the thickness is reduced toward the center (apex) from the peripheral portion.

In one preferred embodiment of the present invention, as shown in FIG. 2, a great number of notches or thin parts 16 are aligned in the radial direction in the spherical projections 12A and 12B. In this embodiment, even if the spherical projections have a relatively large thickness, elastic and reversional deformation is readily caused in the spherical projections.

As the synthetic resin for formation of the spherical injections 12A and 12B, there are preferably used synthetic resins excellent in the mechanical properties, such as a nylon resins, e.g., polyhexamethylene-adipamide, acetal resins, e.g., polyoxymethylene, and polyolefin resins, e.g., polypropylene.

Attachment of the receiving member 6 to the horizontal shaft 4 of the mop supporting frame 1 can easily be accomplished by fitting the horizontal shaft 4 in the grooves 15A and 15B of the inner members 14A and 14B and clamping them integrally together with the outer covers 13A and 13B by means of clamping bolts 17.

In the connector of the present invention, the insert member 5 and receiving member 6 are arranged so as to establish such a dimensional relation that the distance between the apexes of the spherical projections 12A and 12B is smaller than the thickness of the engaging annular spherical portion 7 of the insert member 5 and when the insert member 5 is inserted into the receiving member 6, the engaging annular peripheral portion 7 is rotatably gripped and supported by the peripheral parts of the paired spherical projections 12A and 12B.

When it is intended to connect the mop supporting frame 1 to the mop handle 2, the insert member 5 of the connector is inserted into the insertion space 11 of the receiving member 6. At this point, the apexes of the spherical projections 12A and 12B are pressed by the engaging annular peripheral portion 7 of the insert member 5, whereby elastic and reversional deformation is caused in the spherical projections 12A and 12B in such a manner that the apexes of the spherical projections 12A and 12B sink. Thus, the insert member 5 is inserted and settled at a predetermined position, and in this state, the peripheral parts of the spherical projections 12A and 12B are engaged with the engaging annular peripheral portion 7 of the insert member 5. Thus, the connection of both members is completed. Since the spherical projections 12A and 12B are promptly restored just after deformation, engagement an connection of both members can be accomplished very easily by a one-touch operation of pushing the insert member on the top end of the handle into the receiving member.

In the connector of the present invention, while the spherical projections 12A and 12B of the receiving member 6 are kept engaged with the engaging annular peripheral portion 7 of the insert member 5, since no substantial force is imposed between both members 5 and 6, both the members 5 and 6 are not damaged or worn away during the handle-turning operation at all. Furthermore, since a force substantially equal to the force required for insertion of the insert member 5 into the receiving member 6 is necessary for detachment of the insert member 5 from the receiving member 6, accidental separation of both the members can effectively be prevented. This is another advantage attained by the present invention. Incidentally, separation of the mop supporting frame 1 from the handle 2 can easily be accomplished by a one-touch operation of pullying up the handle 2 while pushing the mop supporting frame 1 by the foot.

What is claimed is:

1. A connector for detachably and rotatably connecting one article to another article, which comprises an insert member to be attached to said one article and a receiving member having a space for insertion of said insert member, which is to be attached to said another member, wherein said insert member has an engaging annular peripheral portion having a void or hollow at the center thereof, a pair of spherical projections capable of elastic and reversional deformation are arranged in the insertion space of the receiving member to confront each other, and such a dimensional relation is established between the engaging annular peripheral portion and the spherical projections that the distance between apexes of the spherical projections is smaller than the thickness of the engaging annular peripheral portion and when said insert member is inserted into the receiving member, the engaging annular peripheral portion is rotatably gripped and supported by the peripheral parts of the paired spherical projections.

2. A connector as set forth in claim 1, wherein said one article is a mop handle and said another article is a mop supporting frame.

3. A connector as set forth in claim 1, wherein in each of said spherical projections, the thickness of the apex is smaller than the thickness of the peripheral part.

4. A connector as set forth in claim 1 or 3, wherein in each of said spherical projections, a great number of notches or thin parts are aligned in the radial direction.

5. A connector as set forth in claim 1, wherein said insert member is formed of a round metal rod or pipe and said insert member comprises two legs extending straight and an annular portion connected thereto.

* * * * *